(12) United States Patent
Boertjes et al.

(10) Patent No.: US 8,509,621 B2
(45) Date of Patent: Aug. 13, 2013

(54) METHOD AND SYSTEM FOR OPTICAL CONNECTION VALIDATION

(75) Inventors: David Boertjes, Nepean (CA); Marc Desjardins, Ottawa (CA); Choudhury Al Sayeed, Ottawa (CA)

(73) Assignee: Ciena Corporation, Hanover, MD (US)

( * ) Notice: Subject to any disclaimer, the term of this patent is extended or adjusted under 35 U.S.C. 154(b) by 177 days.

(21) Appl. No.: 13/028,475

(22) Filed: Feb. 16, 2011

(65) Prior Publication Data

US 2011/0200324 A1 Aug. 18, 2011

Related U.S. Application Data

(60) Provisional application No. 61/305,026, filed on Feb. 16, 2010.

(51) Int. Cl.
*H04J 14/02* (2006.01)

(52) U.S. Cl.
USPC .......................................................... 398/83

(58) Field of Classification Search
None
See application file for complete search history.

(56) References Cited

U.S. PATENT DOCUMENTS

| | | | | |
|---|---|---|---|---|
| 5,712,717 | A * | 1/1998 | Hamel et al. | 398/85 |
| 6,226,424 | B1 * | 5/2001 | Ball et al. | 385/14 |
| 6,842,562 | B2 * | 1/2005 | Kinoshita et al. | 385/24 |
| 6,907,158 | B2 * | 6/2005 | Vohra et al. | 385/24 |
| 2002/0131116 | A1 * | 9/2002 | Shimomura et al. | 359/124 |
| 2006/0098981 | A1 * | 5/2006 | Miura et al. | 398/45 |
| 2007/0297801 | A1 * | 12/2007 | Mostert et al. | 398/81 |
| 2008/0131130 | A1 * | 6/2008 | Chang et al. | 398/83 |
| 2009/0142057 | A1 * | 6/2009 | Nakano | 398/50 |

FOREIGN PATENT DOCUMENTS

WO 2010/043035 A1 4/2010

OTHER PUBLICATIONS

"Scaling limitations in full-mesh WDM ring networks using arrayed-waveguide grating OADMs," Pires et al, Jan. 7, 1999, Electronic Letters, vol. 35, No. 1.*

* cited by examiner

*Primary Examiner* — Kenneth N Vanderpuye
*Assistant Examiner* — Casey Kretzer
(74) *Attorney, Agent, or Firm* — Kent Daniels; Daniels IP Services, Ltd.

(57) ABSTRACT

An optical add/drop multiplexer (OADM) having an Add path for adding optical channel signals input through a plurality of Add ports to an outbound dense wavelength division multiplexed (DWDM) signal, and a Drop path for switching selected channels from an inbound DWDM signal to one or more of a plurality of Drop ports. The OADM has a loopback connection between the Add path and the Drop path. The loopback connection couples a selected loopback channel wavelength from the Add path to the Drop path. The physical connection between a transceiver and the OADM can be verified by connecting the transmitter to an Add port of the OADM and the receiver to a Drop port of the OADM. The OADM is controlled to switch the selected loopback channel wavelength in the Drop path to at least one intended drop port to which the receiver should be connected, and the transmitter is controlled to transmit a predetermined test signal using the loopback channel wavelength. Detecting the test signal by the receiver verifies that the receiver is connected to the at least one intended drop port.

14 Claims, 9 Drawing Sheets

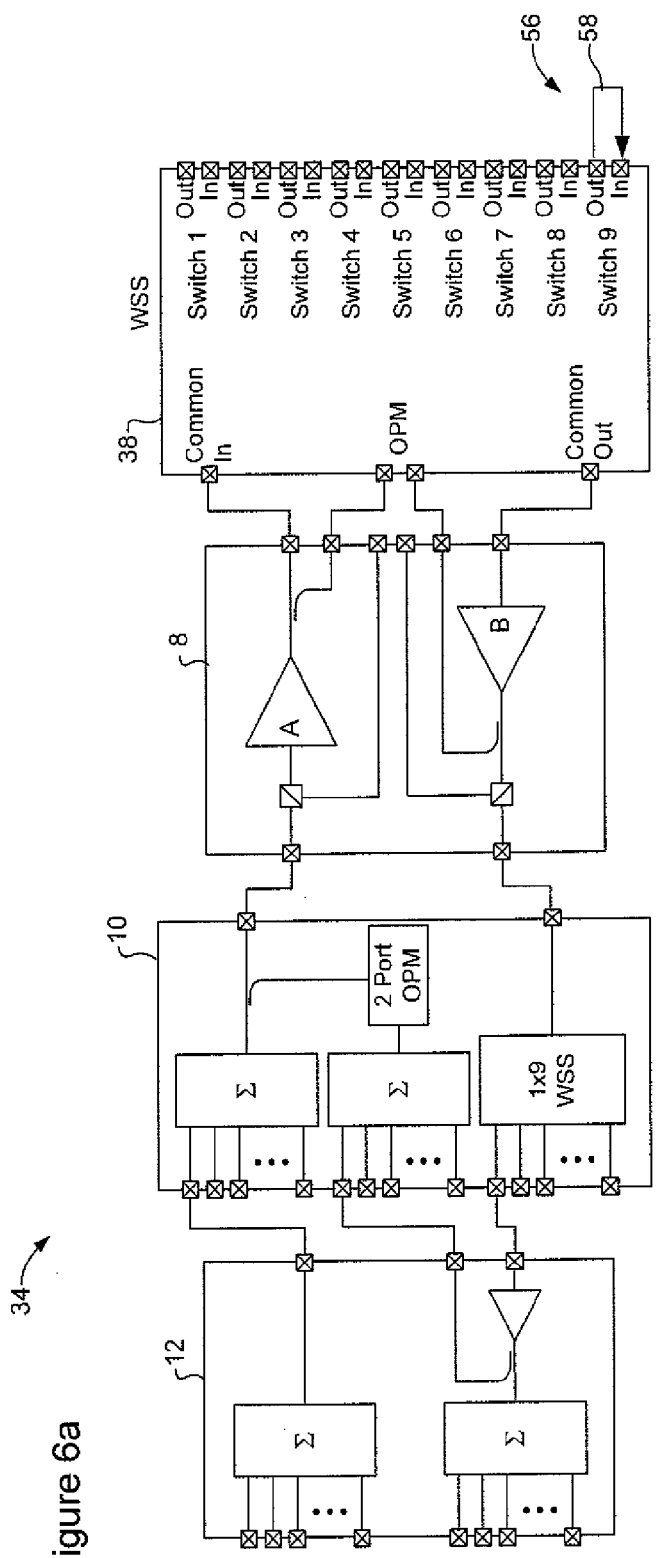
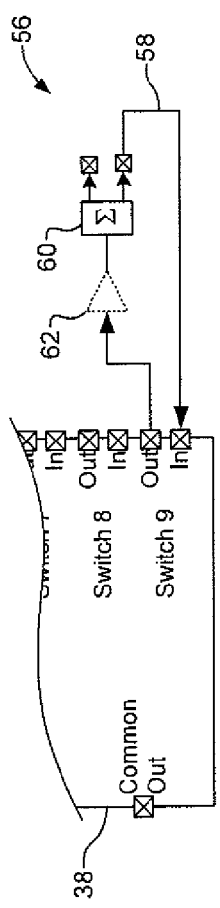
Figure 6a
Figure 6b

METHOD AND SYSTEM FOR OPTICAL CONNECTION VALIDATION

CROSS REFERENCE TO RELATED APPLICATIONS

The present invention is based on, and claims benefit of provisional U.S. patent Application No. 61/305,026 filed Feb. 16, 2010, the entire content of which is hereby incorporated herein by reference.

TECHNICAL FIELD

The present invention relates generally to fibre-optic communication systems, and in particular to techniques for validating optical connections in a fibre-optic communication system.

BACKGROUND

Fibre optic networks often employ tunable technologies both for optical add/drop ports and for transmitters. Transmitters using tunable lasers are desirable for several reasons. First, tunable lasers reduce the number of product variants required to construct the network. For example, a Dense Wavelength Division Multiplexed (DWDM) communications band typically has 80 channels. If fixed wavelength (i.e. non-tunable) lasers are used to drive this channel band, then 80 different variants of the transmitter laser are required. This is problematic, especially for customers who must maintain an inventory of appropriate transmitter components for replacement in the case of failure (sometimes called "sparing"). The second reason is that the use of tunable lasers enables re-tuning the transmission wavelength of any given channel in the system for the purpose of reconfiguration, which in turn enables the implementation of an Optical Add/Drop Multiplexer (OADM).

The Add portion of an OADM can be made tunable by including a tunable filter which is tuned in conjunction with the transmitter laser. Prior to the introduction of practical Digital Signal Processor (DSP) based coherent transmitters, it was commonplace to use Distributed Feedback (DFB) or Distributed Bragg Reflector (DBR) tunable laser designs, which have significant out of band noise in the form of side modes and spontaneous emission. This noise needed to be rejected, which drove the need for filtering the laser output light.

Prior to the introduction of practical DSP based coherent receivers, it was commonplace to use direct detection receivers. In a DWDM system, direct detection receivers require optical filters to separate a desired one wavelength channel from the DWDM signal, and present the separated channel light to the receiver for detection. This type of receiver can detect any wavelength which the optical filter chooses. Therefore, the drop portion of the OADM can be made tunable by including a tunable filter.

However, tunable filters are expensive. Reducing the number of tunable filters is advantageous. With coherent transmitters/receivers, it is possible to reduce or eliminate the filtering from the adds/drops. For example, please refer to PCT/CA2009/001455 titled COHERENT AUGMENTED OPTICAL ADD-DROP MULTIPLEXER and filed on Sep. 11, 2009 which is herein incorporated by reference in its entirety. The result is to replace the optical filters with couplers and splitters which are not wavelength selective.

In a typical OADM, transmitters/receivers and the Add/Drop multiplexer are constructed as separate components, and connected together by manually installed fibre cables. This arrangement allows the user to upgrade a system by adding individual channels over time. However, the manual installation of fibre cables leads to a risk of misconnections due to human error.

The challenge in this case is that in the absence of filtering in the Add/Drop multiplexer, misconnections can be made which place two transmitters of the same wavelength on the same Add/Drop multiplexer. This situation will result in an outage on the affected channel(s).

It is, therefore, desirable to provide a technique for preventing the connection of a transmitter to an optical communications system of a transmitter which is tuned to a channel already in use.

SUMMARY

Aspects of the present invention provide methods and systems to validate the physical connection between the transmitter/receiver and the add/drop multiplexer so as to eliminate traffic outages caused by fibre misconnections. Through the knowledge of where a transmitter/receiver is connected, the system can prevent the tuning of the laser to a wavelength which already exists in the OADM, thereby eliminating the possibility of a traffic outage by such a fibre misconnection.

According to one aspect, a loop back is added which allows for the testing of each newly added transmitter. The loopback allows for the local testing of the placement of the newly added transmitter. Once the placement is confirmed, the channels already in use for that placement are either known, or can be confirmed through testing. For example, each newly added transmitter is initially tuned to some channel that is not to be used by the system (for example a channel just outside the range of the DWDM transmission band), and the loopback allows for the local testing of the placement of the newly added transmitter on such an un-used channel. Finally, the system is trained to use this out-of-band channel to determine which add/drop that any new transmitter and receiver is connected to. Then the in-use channels are removed from the list of available channels that this transmitter may use. Accordingly, the newly added transmitter can be tuned to a channel which is not in use.

Optionally, power monitoring taps are added to the inputs to determine which of the add/drop ports are connected to a transponder. This is particularly useful for modules which use power combiners and splitters, which make it otherwise difficult to determine which port or port pair is used, as the ports are difficult to differentiate after combining/spitting.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Representative embodiments of the invention will now be described by way of example only with reference to the accompanying drawings, in which:

FIG. 6 is a block diagram schematically illustrating a coherent augmented add/drop multiplexer in accordance with a further representative embodiment of the invention;

DETAILED DESCRIPTION

Generally, the present invention provides a method and system for connection testing and/or validation of a newly added transmitter.

Figure 1:
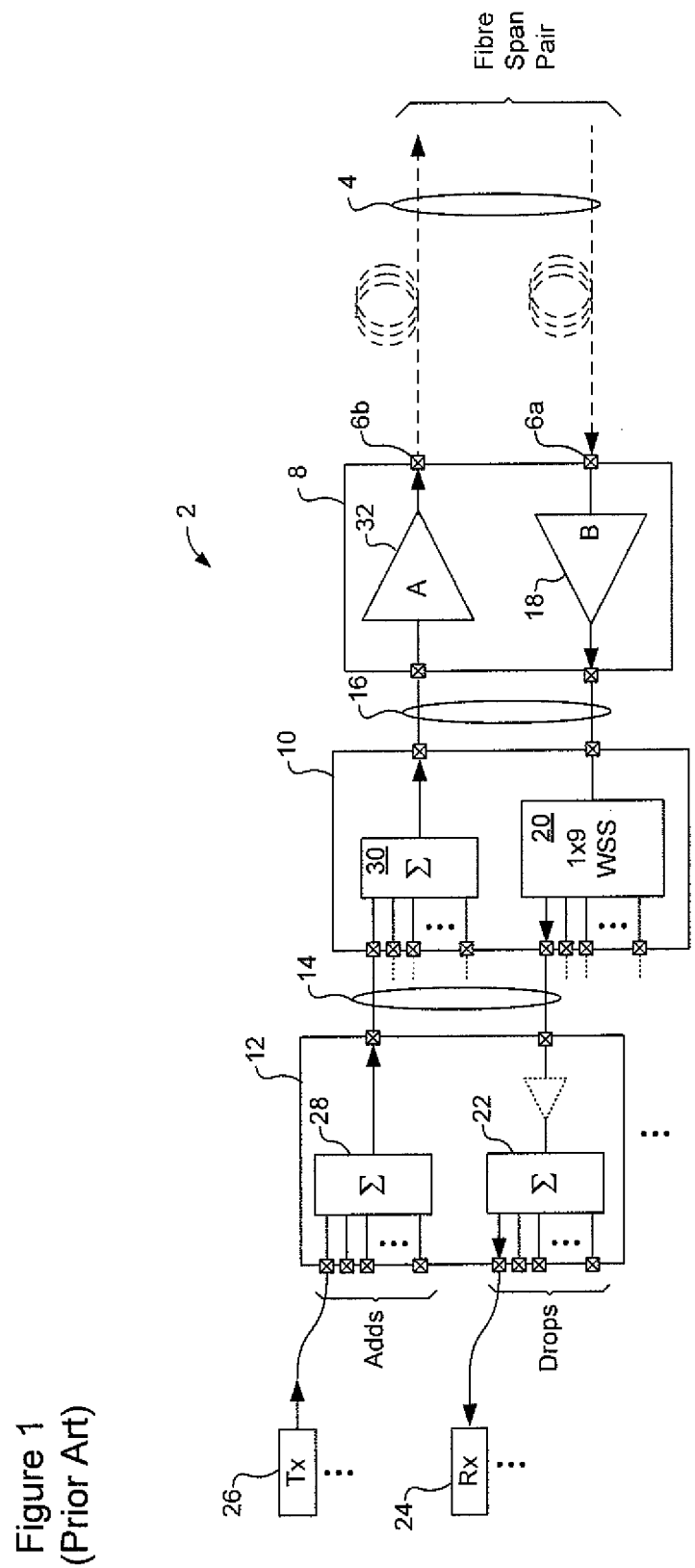
FIG. 1 is a block diagram schematically illustrating a coherent augmented add/drop multiplexer of a type in which techniques in accordance with the present invention may be implemented.

FIG. 1 is a block diagram schematically illustrating principal elements of a reconfigurable optical add/drop multiplexer (ROADM) 2 in which coherent transmitter (Tx) and Receiver (Rx) technology is used to eliminate some of the filtering which is normally required. The add/drop 2 may be connected to send and receive optical dense wavelength division multiplexed (DWDM) signals. In FIG. 1, this connection is represented by an optical fiber span pair 4 connected to respective broadband optical ports 6 of the add/drop 2. However, it will be appreciated that, in many applications, optical routing and switching devices will be connected between the add/drop 2 and the fiber span pair 4, as will be described in greater detail below.

As may be seen in FIG. 1, the ROADM 2 is provided as a set of modules 8-12 interconnected by optical fiber intra-node connections 14-16. In the embodiment of FIG. 1, the modules forming the ROADM 2 comprise an amplifier module 8, a second-stage MUX/DeMUX module 10; and one or more first-stage MUX/DeMUX modules 12. The interconnections 14, 16 between these modules define a Drop path and a Add path of the ROADM 2.

The Drop path comprises a receive amplifier 18 in the amplifier module 8 for amplifying an inbound dense wavelength division multiplexed (DWDM) light (received through the input Broadband port 6a; a wavelength selective switch (WSS) 20 in the second-stage MUX/DeMUX module 10 for routing any selection of channels of the received DWDM light to any of a set of output fibers; and a power divider 22 of the first-stage MUX/DeMUX module 12 for receiving a respective one of the selections of channels, and supplying the light of these channels to a plurality of coherent receivers 24 (only one shown in FIG. 1). With this arrangement, each coherent receiver 24 receives a portion of the light from all of the selected channels on it's respective first-stage MUX/DeMUX module 12, representing only a portion of the received DWDM light, which has a benefit of reducing the common mode rejection performance requirement of the coherent receiver 24 as compared to the requirement when receiving light from all of the channels in the DWDM signal.

The Add path generally mirrors the Drop path, by combining individual channel signals from a plurality of transmitters 26 into an outbound dense wavelength division multiplexed (DWDM) light that is output though the output broadband port 6b. In the embodiment of FIG. 1, the Add path comprises a respective power combiner 28, 30 in each of the first- and second-stage MUX/DeMUX modules 12, 10, and a launch amplifier 32 in the amplifier module 8. The first-stage power combiner 28 operates to combine light from a plurality of transmitters 26 (only one is shown in FIG. 1) onto a single fiber that is connected to the second-stage MUX/DeMUX module 10. When each of the transmitters 26 is tuned to emit light corresponding to a respective different narrow band wavelength channel, the light passed to the second-stage MUX/DeMUX module 10 will be a wavelength division multiplexed (WDM) light comprising each of the transmitted wavelength channels. The second-stage power combiner 30 operates to combine a plurality of channels' light (from respective first-stage power combiners 28) for transmission through the output broadband port 6b. The Add path amplifier 32 is coupled to output broadband port 6b, and operates to amplify the DWDM signal for transmission through downstream optical components, such as the optical fiber span 4.

The block diagram of FIG. 1 only shows a single first-stage MUX/DeMUX module 12 connected to the second-stage MUX/DeMUX module 10. However, it will be appreciated that there can be any number of first-stage MUX/DeMUX modules 12, up to the maximum number of inputs supported by the second-stage MUX/DeMUX module 10.

Figure 2:
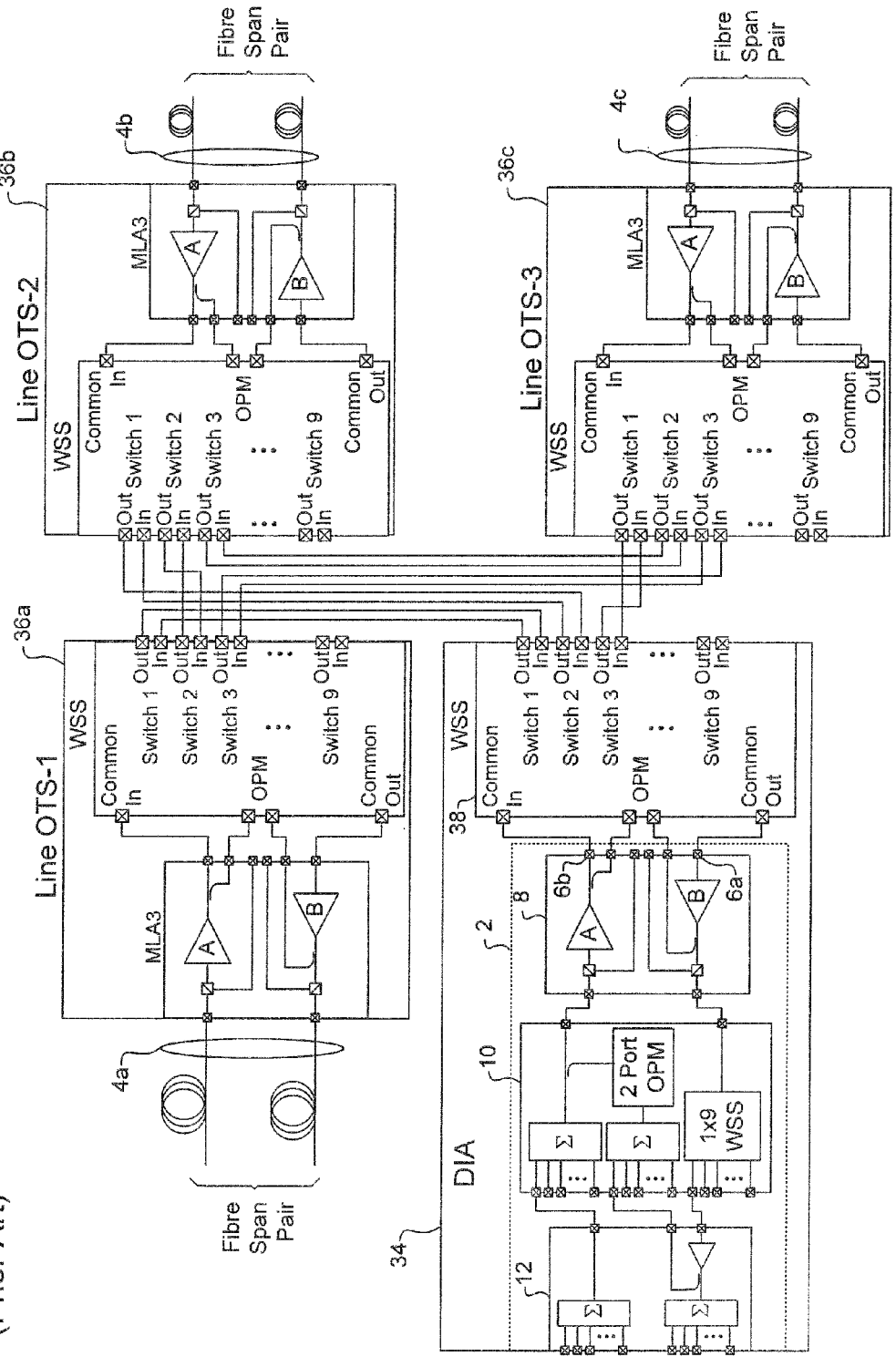
FIG. 2 is a block diagram schematically illustrating a network node incorporating a coherent augmented add/drop multiplexer.

FIG. 2 is a block diagram illustrating a representative network node comprising a directionally independent access (DIA) card 34 optically coupled to three fiber spans 4a-c via respective Optical Transmission Sections (OTSs) 36a-c. As may be seen in FIG. 2, the DIA 34 comprises the ROADM 2 of FIG. 1 coupled to a wavelength selective switch (WSS) 38 which is programmed to selectively switch channels between the ROADM 2 and each of the three OTSs 36. This arrangement combines Rx/Tx tunability with optical switching to enable the DIA 34 to add/drop channels to/from DWDM signals in any of three fiber spans 4a-c. The system shown in FIG. 2 has only one DIA 34 connected to three OTSs 36, whereas a typical network node may have more than one DIA 34, each of which is connected to two or more OTSs 36.

The arrangement of FIGS. 1 and 2 have an advantage in that the MUX/DeMUX operations are performed with very limited optical filtering. However, this advantage is fully realized when the transmitters 26 are tunable within the entire spectral range of DWDM transmission. This degree of Tx tunability creates a risk of misconnection, in which two or more transmitters 26 connected to the Add ports of a given first-stage MUXI/DeMUX module 12, are tuned to the same wavelength. This will cause interference of the affected optical channel signals because there is no filtering, between the Add ports, and the associated WSS 38 cannot switch the (interfering) channel signals in the DWDM signal received from the ROADM 2 to different OTSs 36. Consequently, the interfering channel signals will be transmitted through the network, and produce a loss of signal condition at the receiver (referred to as an 'outage') affecting both channel signals.

Figure 3:
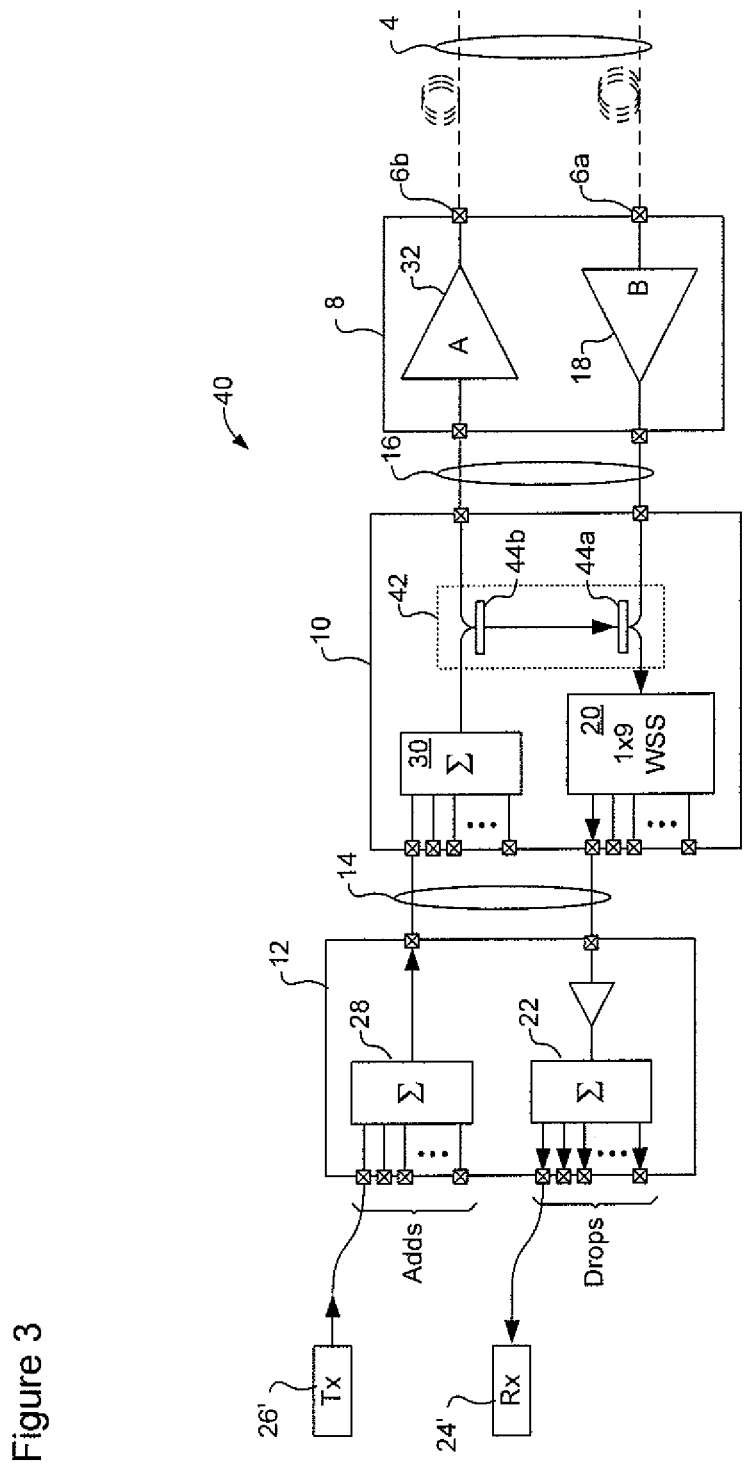
FIG. 3 is a block diagram schematically illustrating a coherent augmented add/drop multiplexer in accordance with a representative embodiment of the invention.

FIG. 3 is a block diagram illustrating a ROADM 40 in accordance with a first representative embodiment of the present invention. As may be seen in FIG. 3, the ROADM 40 is closely similar to that of FIG. 1, and can therefore be used in the DIA 34 of FIG. 2. However, the ROADM 40 of FIG. 3 differs from that of FIG. 1, in that it incorporates a loop-back connection 42 which is designed to couple a selected loopback channel directly from the Add path to the Drop path. In some embodiments, the loop-back connection 42 may comprise a pair of inexpensive fixed frequency optical filters 44*a*-*b* designed to pass the selected loop-back channel wavelength, while reflecting out-of band signals. In some embodiments the loop-back channel wavelength is chosen so that it does not correspond with a channel that is normally used in the system. For example, the loop-back channel wavelength may lie outside the DWDM transmission band. With this arrangement, the out-of-band wavelengths rejected by the filters 44 will correspond with the DWDM transmission band, so that isolation between the Add and Drop paths is maintained for DWDM transmission band.

The loop-back connection 42 can be used to determine the add/drop ports that a new transmitter/receiver pair is connected to. This is achieved by programming the WSS 20 of the second-stage MUX/DeMUX module 10 to switch the loop-back channel to the specific first-stage divider 22 to which the new receiver 24' should be connected. The new transmitter 26' can then be tuned to the loop-back channel wavelength, and driven to transmit a predetermined test signal (such as, for example, a signal contain identification information of the new transmitter). As may be seen in FIG. 3, this test signal (in the loop-back-channel) will be routed through the loop-back connection 42 to the second-stage WSS 20 and switched to the intended first-stage divider 22. If the new receiver 24' is in fact connected to a Drop port of the intended divider 22, it will receive the test signal, which enables verification that the new receiver 24' and transmitter 26' have been properly connected to the ROADM 40. Then, the channel wavelengths already in use (by other transmitters, not shown, connected to the ROADM 40) can be removed from the set of channel wavelengths that the new transmitter 26' may use. In this way, connection between the ROADM 40 and the new receiver 24' can be verified, and the new transmitter 26' can be prevented from tuning to channel wavelength which already is carrying traffic (and thereby and causing an outage).

Loopback can be active for one or more channels depending on the characteristics of the filter 44 used in the loop-back connection 42 and the number of channels which can be switched by the WSS 20. Loopback may be active for more than just the time it takes to do the connection validation. It may be useful for idle transponders (those which are not yet carrying traffic, or which have been taken out of active service) to have a loopback active to monitor their performance, so that when it is decided to put them into service for carrying traffic, one has a greater confidence that they are working properly.

Figure 4B:
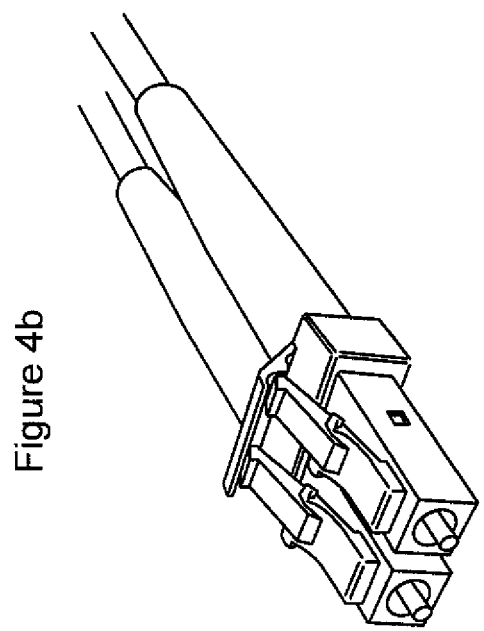
FIGS. 4a and 4b are perspective views showing a paired or duplex connectors usable in the coherent augmented add/drop multiplexers of FIGS. 1 and 3.
Figure 4A:
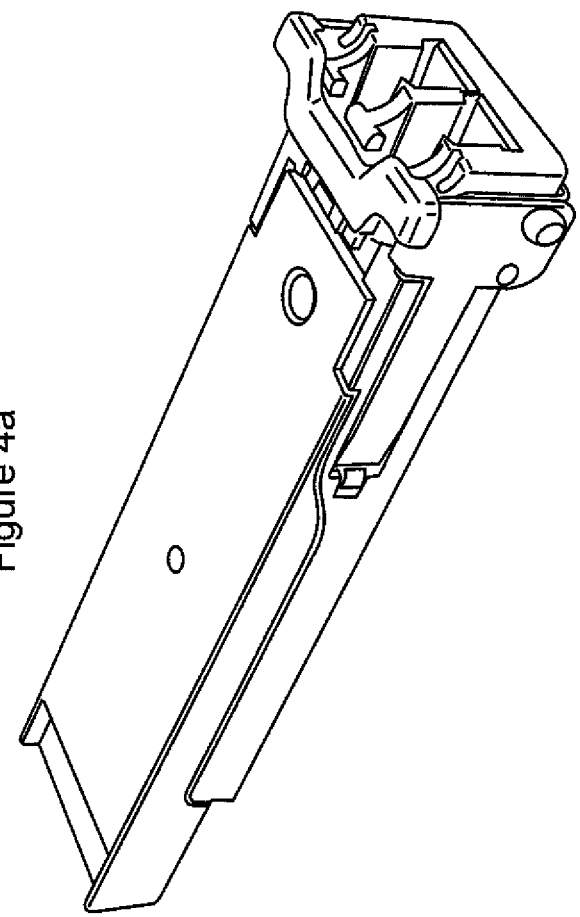

As is known in the art, optical components and connections are typically packaged as paired units. For example, a receiver and a transmitter will normally be packaged together as a transceiver, which may have a form illustrated in FIG. 4*a*. Similar paired packaging is commonly used for MUX/DeMUX modules, Add and Drop ports, and fiber transmission cables. Accordingly, the risk of misconnection in fibre optic systems can be reduced by providing duplex, or paired optical connectors, with duplex fibres and duplex receptacles, such as may be seen in FIG. 4*b*. In this way, one can be sure that the transmitter and receiver packaged together in a given transponder are connected to the same port pair of the first MUX/DeMUX module 12, and then verification of whether or not it is the correct port pair can be performed using the methods described above with reference to FIG. 3.

As may be appreciated, a colourless ROADM provides many opportunities for making paired connections. For example, paired connections can be used for either (or both) of the intra-nodal connections 14-16 of the ROADMs of FIGS. 1-3. Paired connections, in conjunction with the loopback verification technique described above, validates both the transmitter and receiver connections, as well as those between the first and second-stage MUX/DeMUX modules 10-12.

Figure 5:
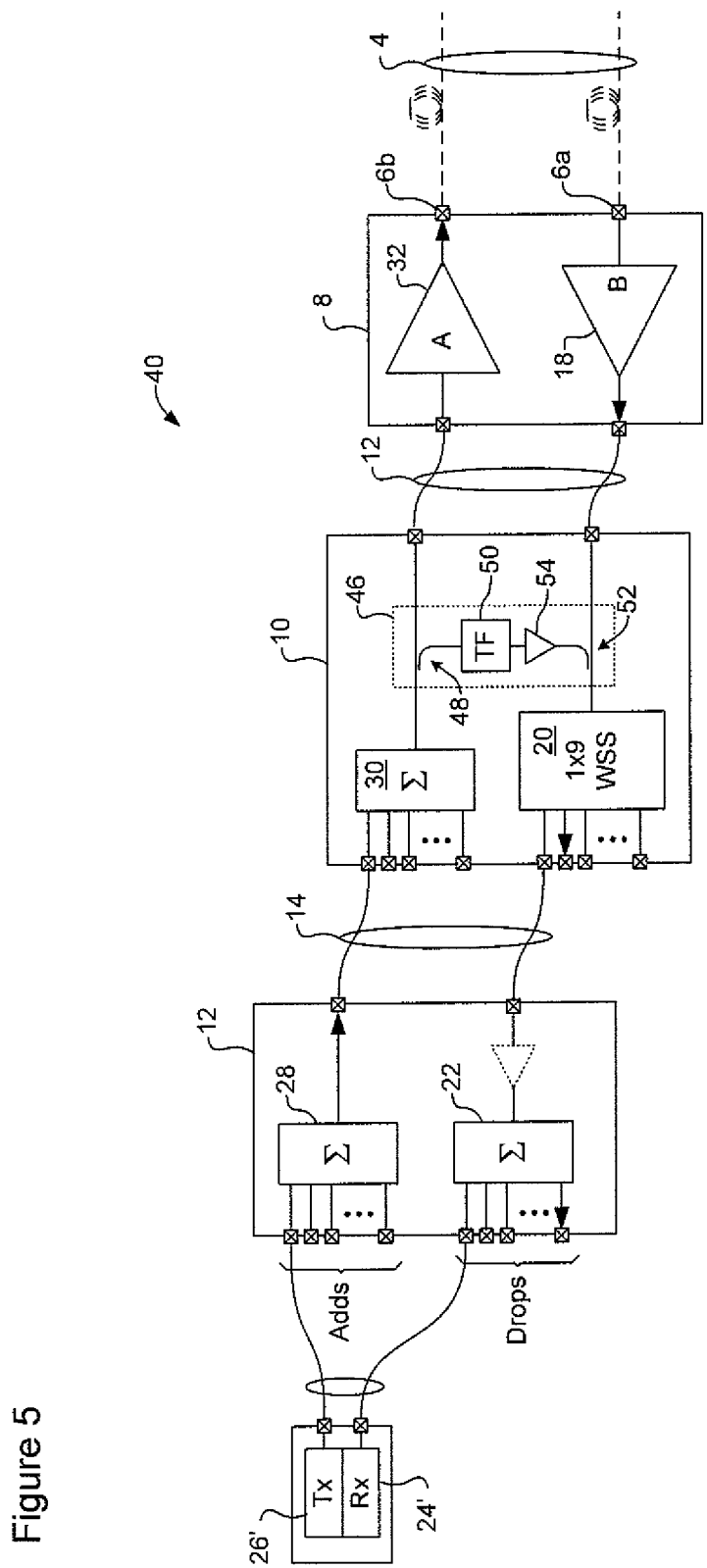
FIG. 5 is a block diagram schematically illustrating a coherent augmented add/drop multiplexer in accordance with a further representative embodiment of the invention.

FIG. 5 shows another embodiment in which, instead of having a fixed wavelength loop-back channel, any channel that is switchable by the WSS 20 can be used for connection validation. In this case, the loopback connection 46 comprises an optical tap 48 which takes some of the light from the Add path, and redirects it to a tunable filter (TF) 50. This TF 50 can be tuned to a desired channel wavelength that is being used for connection validation, which could be any channel in the DWDM transmission band, or an out-of-band channel if desired. A second tap 52 can then be used to insert the loop-back channel into the Drop path. An amplifier 54 may be provided, if desired, in order to overcome losses through the loopback connection 46. When the loopback connection 46 is not active, the tunable filter 50 may be tuned to an unused part of the DWDM transmission spectrum, and/or the amplifier 54 may be turned off.

FIGS. 6*a*-*b* show another embodiment for achieving optical connection validation. The previously discussed embodiments utilize a loopback connection 42,46 that is incorporated within the ROADM 40 and so does not rely on external components (such as the WSS 38 of a DIA card 34 to for connection validation. In fact, the embodiments of FIGS. 3 and 5 can operate in an OADM or point-to-point architecture in addition to a DIA. The embodiment of FIG. 6, on the other hand, is tailored to the DIA architecture, but has the advantage of not requiring any filters in the loopback connection. As may be seen in FIG. 6*a*, a loopback connection 56 uses a fibre jumper 58 connecting a pair of ports of the WSS 38. The WSS 38 can be programmed to send one or more channels through this loopback connection 56, by directing the desired channel (s) to the associated output port (in FIG. 6*a*, the loopback connection 56 is provided on the Output/Input port labelled "switch 9" but any other port pair may be used). With this arrangement, connection verification using the methods described above can be accomplished for any one or more channels simultaneously, limited only by the wavelength switching capability of the WSS 38.

FIG. 6*b* illustrates a variation of this approach, in which the loopback connection 56 further includes a power divider 60 and (optionally) an amplifier 62. In some cases, the power divider 60 and amplifier 62 may be incorporated in the WSS 38. In other cases, the power divider 60 and amplifier 62 may be integrating into a package with the jumper 58. The arrangement of FIG. 6*b* is beneficial in that enables test signals generated during loop-back operation to be tapped from the loopback connection 56 and used, for example, for evaluating performance of the DIA 34 in addition to connection verification.

Figure 7:
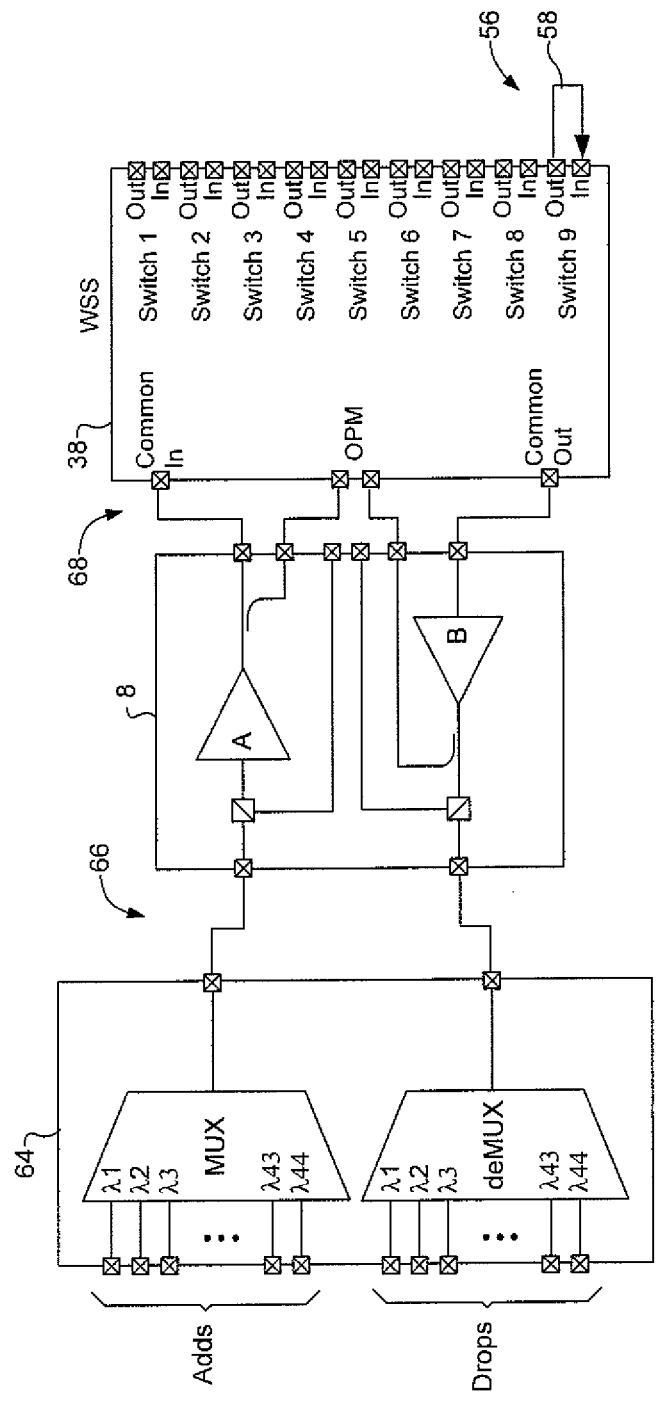
FIG. 7 is a block diagram schematically illustrating a coherent augmented add/drop multiplexer in accordance with a further representative embodiment of the invention.

FIG. 7 illustrates the method of FIGS. 6*a*-*b* applied to an Add/drop multiplexer that utilizes a fixed wavelength filter-based MUX/DeMUX module 64. In this case, the risks associated with misconnecting transmitters/receivers to the Add/Drop ports of the MUX/DeMUX module 64 are reduced, but the loopback connection 56 is still useful for validating the intra-nodal connections 66-68 between the modules, a well as stand-by capacity monitoring.

Figure 8:
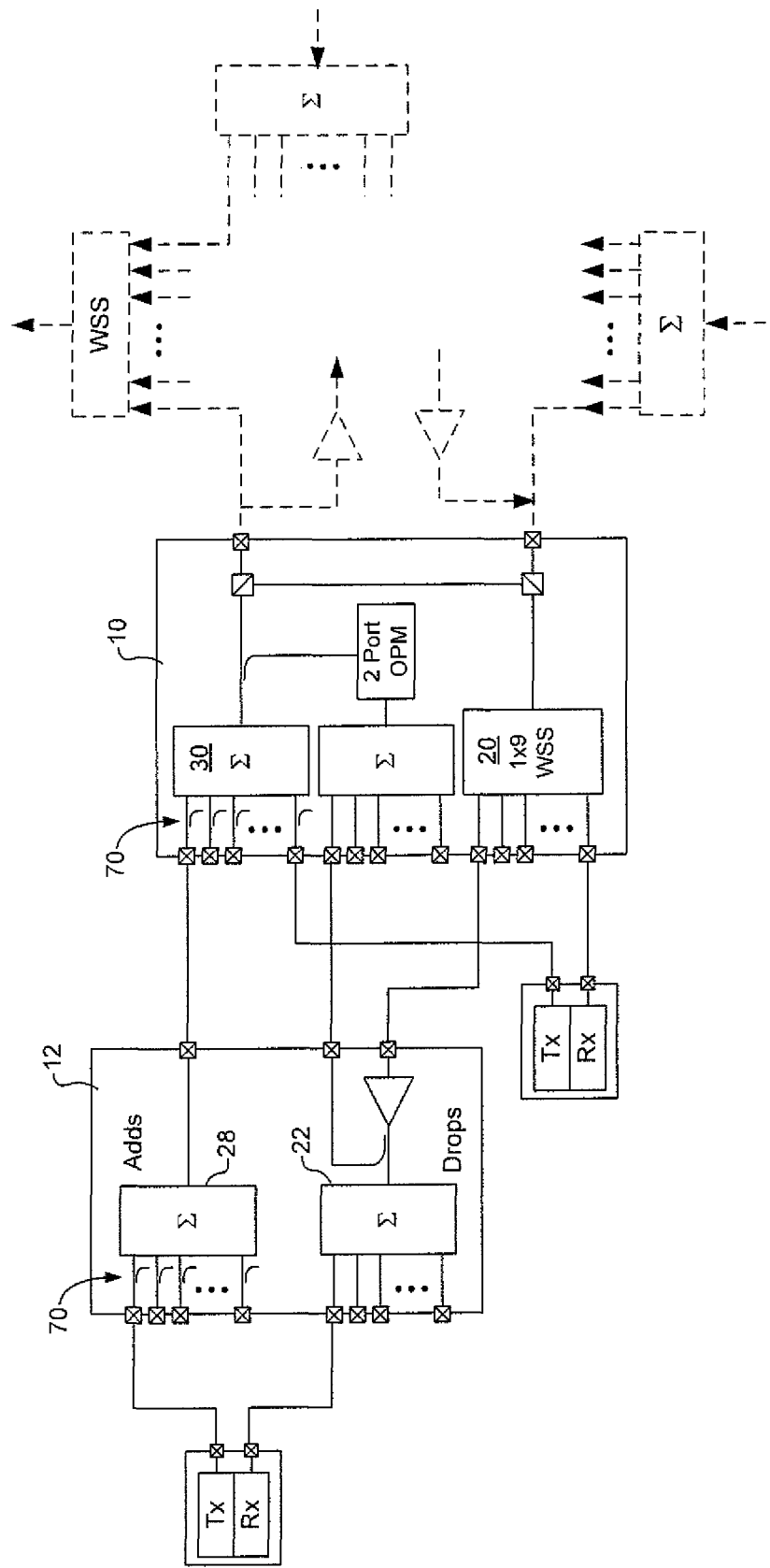
FIG. 8 is a block diagram schematically illustrating a coherent augmented add/drop multiplexer in accordance with a further representative embodiment of the invention.

As noted above with reference to FIGS. 3 and 4, the loop-back process can be used to validate that a new receiver 24' is connected to the correct first-stage power divider 22. When paired components and duplex connections are used (as described with reference to FIG. 4), this approach helps to ensure that a transceiver (transmitter/receiver pair) are connected to the correct MUX/DeMUX module 12 (comprising a matched pair of divider 22/combiner 28 for the Drop and Add paths, respectively). However, it does not provide any indication of the specific Add/Drop port of the MUX/DeMUX module 12 to which the transceiver is connected. FIG. 8 illustrates an embodiment in which the Add path input ports, in both the first and second MUX/DeMUX modules 10 and 12 are provided with power taps 70, which enable the signal received through each port to be monitored. With this arrangement, when the connection of a new transponder is being verified, a monitoring subsystem (not shown) can examine each of the input ports to detect the presence of the test signal being transmitted by the new transmitter 26, and so determine which port the transponder is connected to. This connection validation can be performed equally for transponders connected to the first-stage MUX/DeMUX module 12 or to the second-stage MUX/DeMUX module 10, as may be seen in FIG. 8.

Figure 9:
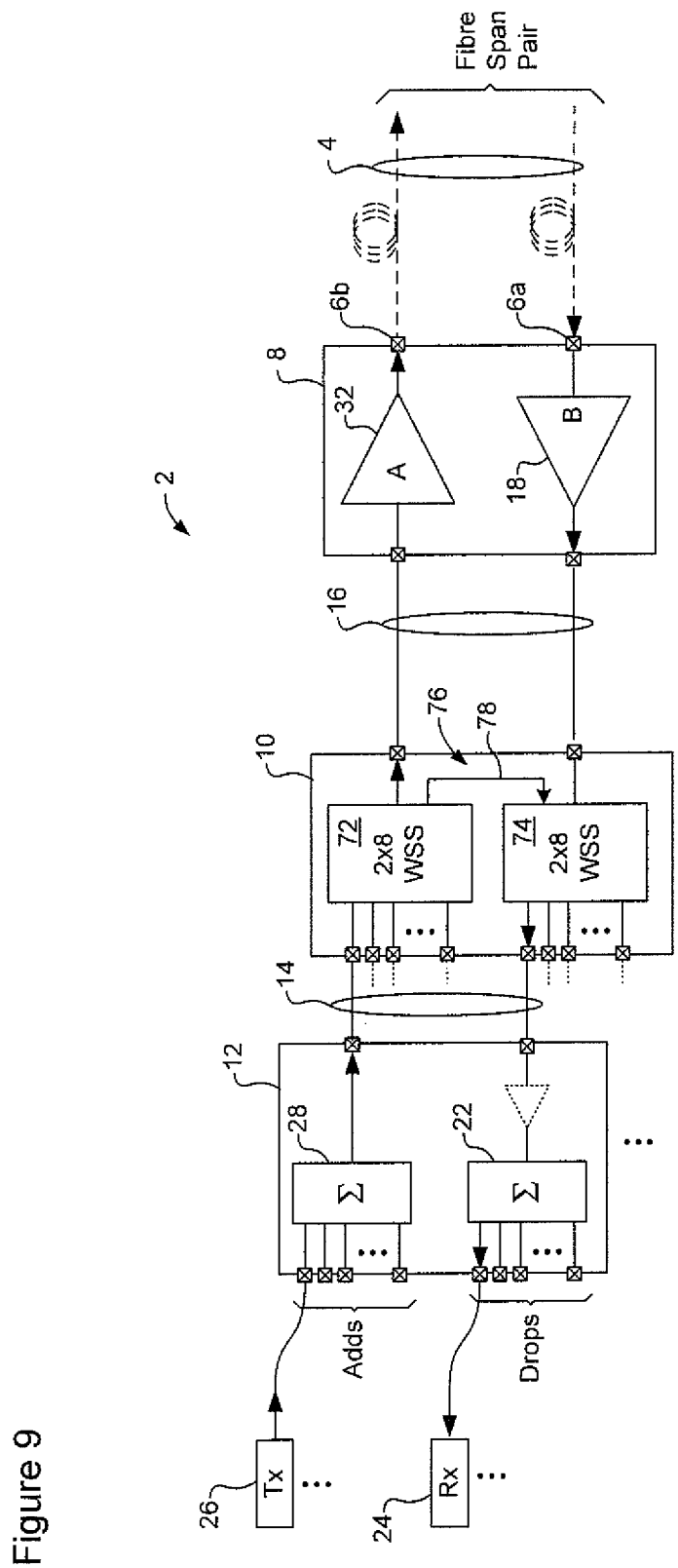
FIG. 9 is a block diagram schematically illustrating a coherent augmented add/drop multiplexer in accordance with a further representative embodiment of the invention It will be noted that throughout the appended drawings, like features are identified by like reference numerals.

FIG. 9 illustrates an embodiment in which the second level MUX/DeMUX module 10 comprises a respective 2×8 wavelength selective switch 72, 74 in each of the Add and Drop paths. In this case, each of these WSSs 72, 74 is configured with two common ports, one of which is connected to facilitate Add/Drop signal path operation. The second common port of each WSSs 72, 74 are used for the loop-back connection. As may be seen in FIG. 9, a loopback connection 76 uses a fibre jumper 78 connecting the second common ports of the WSSs 72, 74. The Add-path WSS 72 can be programmed to send one or more channels through this loopback connection 76, by directing the desired channel(s) to the associated common port. With this arrangement, connection verification using the methods described above can be accomplished for any one or more channels simultaneously, limited only by the wavelength switching capability of the WSSs 72, 74. A further advantage of this arrangement is that filters (either fixed or tunable) are not required in the loopback connection 76.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

We claim:

1. A method of connecting a transceiver including a transmitter and a receiver to an optical add/drop multiplexer (OADM), the method comprising:
    providing a loopback connection between an Add path and a Drop path of the OADM, the loopback connection coupling a selected loopback channel wavelength from the Add path to the Drop path;
    connecting the transmitter to an Add port of the OADM;
    connecting the receiver to a Drop port of the OADM;
    controlling the OADM to switch the selected loopback channel wavelength in the Drop path to at least one intended drop port to which the receiver should be connected;
    controlling the transmitter to transmit a predetermined test signal using the loopback channel wavelength; and
    detecting the test signal by the receiver to verify that the drop port to which the receiver is connected corresponds with the at least one intended drop port.

2. The method of claim 1, wherein the selected loopback channel wavelength lies outside a transmission band of a dense wavelength division multiplexed (DWDM) signal.

3. The method of claim 2, wherein the step of providing a loopback connection comprises providing a pair of fixed wavelength filters disposed in a loopback path between the Add path and the Drop path of the OADM, the fixed wavelength filters being configured to pass the selected loopback channel wavelength and reflect other wavelengths.

4. The method of claim 1, wherein the step of providing a loopback connection comprises providing a tunable filter disposed in a loopback path between the Add path and the Drop path of the OADM, the tunable filter being tunable to pass the selected loopback channel wavelength.

5. The method of claim 1, wherein the selected loopback channel wavelength corresponds with a channel of a dense wavelength division multiplexed (DWDM) signal.

6. The method of claim 5, wherein the step of providing a loopback connection comprises:
    providing a jumper between a predetermined output port and a corresponding input port of a wavelength selective switch coupled to the OADM; and
    controlling the wavelength selective switch to switch the selected loopback channel wavelength to the predetermined output port, such that the jumper will couple the test signal to the corresponding input port of the wavelength selective switch.

7. The method of claim 5, wherein the step of providing a loopback connection comprises:
    providing a jumper between respective common ports of an Add path wavelength selective switch and a Drop path wavelength selective switch; and
    controlling the Add path wavelength selective switch to switch the selected loopback channel wavelength to its respective common port such that the jumper will couple the test signal to the corresponding common port of the Drop path wavelength selective switch.

8. An optical add/drop multiplexer (OADM) having an Add path for adding optical channel signals input through a plurality of Add ports to an outbound dense wavelength division multiplexed (DWDM) signal, and a Drop path for switching selected channels from an inbound DWDM signal to one or more of a plurality of Drop ports, the OADM comprising:
- a loopback connection between the Add path and the Drop path of the OADM, the loopback connection coupling a selected loopback channel wavelength from the Add path to the Drop path, such that a test signal transmitted by a transmitter connected to an Add port can be coupled to the Drop path via the loopback connection and switched to at least one intended Drop port to validate by detection of the test signal by a receiver that a Drop port to which the receiver is connected corresponds with the at least one intended Drop port.

9. The OADM of claim 8, wherein the selected loopback channel wavelength lies outside a DWDM transmission band.

10. The OADM of claim 8, wherein the loopback connection comprises a pair of fixed wavelength filters disposed in a loopback path between the Add path and the Drop path, the fixed wavelength filters being configured to pass the selected loopback channel wavelength and reflect other wavelengths.

11. The OADM of claim 8, wherein the loopback connection comprises a tunable filter disposed in a loopback path between the Add path and the Drop path, the tunable filter being tunable to pass the selected loopback channel wavelength.

12. The OADM of claim 8, wherein the selected loopback channel wavelength corresponds with a channel of the DWDM transmission band.

13. The OADM of claim 12, wherein the loopback connection comprises:
- a jumper between a predetermined output port and a corresponding input port of a wavelength selective switch coupled to the OADM;
- wherein the wavelength selective switch is controlled to switch the selected loopback channel wavelength to the predetermined output port, such that the jumper will couple the test signal to the corresponding input port of the wavelength selective switch.

14. The OADM of claim 12, wherein the loopback connection comprises:
- a jumper between respective common ports of an Add path wavelength selective switch and a Drop path wavelength selective switch;
- wherein the Add path wavelength selective switch is controlled to switch the selected loopback channel wavelength to its respective common port such that the jumper will couple the test signal to the corresponding common port of the Drop path wavelength selective switch.

* * * * *